Patented Aug. 10, 1948

2,446,975

UNITED STATES PATENT OFFICE 2,446,975

SILICA BRICK

Charles Conley, Canton, Ohio, assignor to Republic Steel Corporation, Cleveland, Ohio, a corporation of New Jersey No Drawing. Application October 19, 1944,
Serial No. 559,475

7 Claims. (Cl. 106—69)

This invention relates generally to silica bricks and is particularly concerned with new and improved silica bricks which possess great resistance to spalling and erosion when subjected to high temperatures and hot gases carrying fluxing materials.

For many years silica bricks for high temperature service, such as liners of the roofs of steel making furnaces, have been made from quartz consisting principally of $SiO_2$ with varying amounts of CaO, $Al_2O_3$, FeO and MgO. A typical composition of the principal ingredients in the mixture used in making silica brick is as follows:

| | Per cent |
|---|---|
| SiO | 95 –96 |
| $Fe_2O_3$ | 0.5 – 1.0 |
| $Al_2O_3$ | 1.0 – 1.5 |
| CaO | 1.75– 2.5 |
| MgO | Trace– 0.5 |

Such bricks possessed short service lives for they rapidly wore away either by reason of spalling or erosion. Spalling is the flaking off of surface portions of the brick and is largely traceable to the sudden expansion of quartz which is as much as 4.3% and which occurs at about 1075° F. Spalling may be minimized by transforming the quartz into tridymite which has a sudden expansion of only about 0.1% and which occurs at about 300° F.; or into cristobalite which has a sudden expansion of about 1.0% and which occurs at about 475° F. Any such transformation should be brought about during the firing of the "green brick." Since small grains transform more rapidly and completely than large grains, only grains smaller than $\frac{3}{16}''$ have been used heretofore in commercial silica bricks.

Erosion is the conversion of surface portions of the brick into a liquid phase and removal of the resulting fluid material. The liquid phase is formed by a fluxing action on material of the brick by the action of fluxing materials in the hot furnace gases with a resultant lowering of the melting point of surface portions of the brick. Liquid phase material tends to flow on the surface of the brick and to be dragged thereover and flicked away therefrom by the swiftly moving, high temperature gases which contact with it. As this material is removed from the brick fresh surfaces are exposed to the fluxing materials in the gases and thus the process is repeated and the brick is rapidly eroded. Erosion proceeds at a greater rate on very small grains than on large grains.

The prior workers in the art, confronted with these apparently irreconcilable factors, minimized spalling by employing quartz grains of sizes which could be readily transformed into tridymite or cristobalite but endured the high erosion rate resulting from the presence of such fine grains.

A typical composition of prior art silica bricks as regards the sizes of grains and the percentages of the different sizes is set out in the following Table I:

Table I

| Screen # U. S. Standard Sieve Series | Screen Opening in inches | Percentage |
|---|---|---|
| 2 | .371 | 0 ⎫ |
| 3 | .263 | 0 ⎬ Coarse |
| 4 | .185 | 0 ⎭ |
| 6 | .131 | 3 |
| 8 | .093 | 7 |
| 14 | .046 | 20 ⎫ |
| 20 | .0326 | 16 ⎬ |
| 40 | .0165 | 15 ⎬ Medium |
| 60 | .0198 | 8 |
| 100 | .0059 | 8 ⎭ |
| 140 | .0041 | 6 ⎫ Fine |
| Less than 140 | | 17 ⎭ |

By the present invention I have been able to produce new silica bricks having service lives which are considerably greater than the lives of the prior art bricks, particularly when subjected to the severe service conditions encountered in electric and open hearth steel making furnaces. This invention is predicated on the discovery that a pronounced decrease in rate of erosion without any material increase in spalling may be achieved by properly selecting and proportioning quartz grains of different sizes, including sizes larger than have been used heretofore.

Bricks embodying the present invention may consist of quartz grains within the size and percentage ranges set out in the following Table II:

Table II

| Screen # U. S. Standard Sieve Series | Screen Opening in inches | Percentage |
|---|---|---|
| 2 | .371 | 0 to 3 ⎫ |
| 3 | .263 | 1 to 5 ⎬ |
| 4 | .185 | 1 to 5 ⎬ Coarse |
| 6 | .131 | 4 to 8 |
| 8 | .093 | 2 to 11 ⎭ |
| 14 | .046 | 11 to 13 ⎫ |
| 20 | .0326 | 13 to 15 |
| 40 | .0165 | 10 to 12 ⎬ Medium |
| 60 | .0098 | 4 to 6 |
| 100 | .0059 | 8 to 10 ⎭ |
| 140 | .0041 | 9 to 11 ⎫ Fine |
| Less than 140 | | 15 to 20 ⎭ |

The composition of a typical brick which has given good satisfaction in commercial use is set out in the following Table III:

*Table III*

| Screen # U. S. Standard Sieve Series | Screen Opening in inches | Percentage | |
|---|---|---|---|
| 3 | .263 | 3.0 | Coarse |
| 4 | .185 | 3.0 | |
| 6 | .131 | 6.0 | |
| 8 | .093 | 9.0 | |
| 14 | .046 | 12.0 | Medium |
| 20 | .0326 | 14.0 | |
| 40 | .0165 | 11.0 | |
| 60 | .0098 | 5.0 | |
| 100 | .0059 | 9.0 | |
| 140 | .0041 | 10.0 | Fine |
| Less than 140 | | 18.0 | |

The bricks of the present invention may be made by the practice now common in making silica bricks. The predetermined amounts of the various sizes of quartz grains are mixed and the mixture is formed into "green" bricks and fired in the ordinary manner. These bricks have a fusing point of about 3050° F. before service, which is comparable to that of prior commercial brands of silica bricks.

It will be noted from consideration of Table II that the coarse sized grains range in size from .371" to .093" and comprise from 8% to 32% of the mixture; the medium sized grains range from .046" to .0059" and comprise from 46% to 56% of the mixture; and the fine sized grains .0041" and smaller, comprise from 24% to 31% of the mixture. In Table III the coarse, medium and fine grains represent, respectively, 21%, 51% and 28% of the mixture.

A comparison of Tables I and II shows that the bricks embodying the present invention contain from 2% to 13% of grains exceeding .185" or about 3/16" in size, while the prior bricks contain substantially no grains in that range; that the present bricks contain from 24% to 31% of grains less than .0041" in size, as compared to 23% of corresponding sized grains of prior bricks; and that the present bricks contain from 46% to 56% of the medium sized grains which range from .046" to .0059", which is substantially less than the 67% of correspondingly sized particles in prior bricks.

I have discovered that when the mixture contains coarse quartz grains within the range of size and percentage just stated substantially all the quartz therein may be transformed into tridymite and cristobalite, during firing, with substantially complete avoidance of spalling incident to sudden expansion of the grains in the normal operation of a steel making furnace; and that when the coarse grains are present, the amount of medium sized grains is reduced and the amount of fine grains is increased, the erosion rate is decreased. I believe that the fine grains are better protected from erosion by being located in the voids between the coarse grains. Only a small percentage of the fine grains were disposed in the voids between the medium sized grains of the prior art and, as a result, the fine grains were not well protected against the action of fluxing materials in the gases and erosion occurred at a rapid rate. By providing more and larger voids, I am able better to protect the fine grains and greatly to reduce the rate of erosion.

Bricks embodying the present invention have been used as liners for roofs of electric steel melting furnaces and have been serviceable after as many as 26 heats have been made in such a furnace as compared with 20 heats which was the maximum number obtainable with bricks of the prior art.

The bricks of the present invention have an apparent specific gravity, as determined by the A. S. T. M. tentative standards 1939 test method C–20–33, of not more than 2.34 or 2.35 and apparent specific gravities less than 2.4 have given the most favorable results altho good results have been obtained with apparent specific gravities as high as 2.48.

Having thus described my invention so that others skilled in the art may be able to understand and practice the same, I state that what I desire to secure by Letters Patent is defined in what is claimed.

What is claimed is:

1. A silica brick having an apparent specific gravity of from 2.34 to 2.48 and composed of a mixture of coarse, medium and fine sized grains consisting essentially of tridymite and cristobalite, the coarse grains ranging in size from .371" to .093" and constituting from 8% to 32% of said mixture, the medium grains ranging in size from .046" to .0059" and constituting from 46% to 56% of the mixture, and the fine grains ranging in size from .0041" to finer and constituting from 24% to 31% of the mixture.

2. A silica brick having an apparent specific gravity of from 2.34 to 2.48 and composed of a mixture of coarse, medium and fine sized grains consisting essentially of tridymite and cristobalite, coarse grains ranging in size from .371" to .093" and constituting from 13% to 30% of the mixture, the medium grains ranging in size from .046" to .0059" and constituting from 46% to 56% of the mixture, the fine grains ranging in size from .0041" to finer and constituting from 24% to 31% of the mixture.

3. A silica brick having an apparent specific gravity of from 2.34 to 2.48 and composed of a mixture of coarse, medium and fine sized grains consisting essentially of tridymite and cristobalite, the coarse grains ranging in size from .371" to .093" and constituting from 8% to 32% of said mixture, between 2% and 13% of the mixture being coarse grains ranging in size from .371" to .185", the medium grains ranging in size from .046" to .0059" and constituting from 46% to 56% of the mixture, and the fine grains ranging in size from .0041" to finer and constituting from 24% to 31% of the mixture.

4. A silica brick having an apparent specific gravity of from 2.34 to 2.48 and composed of a mixture of coarse, medium and fine sized grains consisting essentially of tridymite and cristobalite, the coarse grains ranging in size from .371" to .093" and constituting from 8% to 32% of said mixture, from 2% to 13% of the mixture being coarse grains ranging in size from .371" to .185", the medium grains ranging in size from .046" to .0059" and constituting from 46% to 56% of the mixture, from 34% to 40% of the mixture being medium grains ranging in size from .046" to .0165", and the fine grains ranging in size from .0041" to finer and constituting from 24% to 31% of the mixture.

5. A silica brick having an apparent specific gravity of from 2.34 to 2.48 and composed of a mixture of coarse, medium and fine sized grains consisting essentially of tridymite and cristobalite, the coarse grains ranging in size from .263" to .093" and constituting 21% of said mixture, the medium grains ranging in size from .046" to .0059" and constituting 51% of the mixture, and the fine grains ranging in size from .0041" to finer and constituting 28% of the mixture.

6. A silica brick having an apparent specific gravity of from 2.34 to 2.48 and composed of a mixture of coarse, medium and fine sized grains consisting essentially of tridymite and cristobalite, the coarse grains ranging in size from .263" to .093" and constituting 21% of said mixture, 6% of the mixture being coarse grains ranging in size from .263" to .185", the medium grains ranging in size from .046" to .0059" and constituting 51% of the mixture, and the fine grains ranging in size from .0041" to finer and constituting 28% of the mixture.

7. A silica brick having an apparent specific gravity of from 2.34 to 2.48 and composed of a mixture of coarse, medium and fine sized grains consisting essentially of tridymite and cristobalite, the coarse grains ranging in size from .371" to .093" and constituting 21% of said mixture, at least 6% of the mixture being coarse grains ranging in size from .263" to .185", the medium sized grains ranging from .046" to .0059" and constituting 51% of the mixture, 37% of the mixture being medium grains ranging in size from .046" to .0165" and fine grains ranging in size from .0041" to finer and constituting 28% of the mixture, 10% of the mixture being fine grains of .0041" in size.

CHARLES CONLEY.

REFERENCES CITED

The following references are of record in the file of this patent:

UNITED STATES PATENTS

| Number | Name | Date |
|---|---|---|
| 1,791,591 | Caven | Feb. 10, 1931 |
| 1,969,751 | Heuer | Aug. 14, 1934 |
| 2,286,361 | Howell et al. | May 12, 1942 |

FOREIGN PATENTS

| Number | Country | Date |
|---|---|---|
| 122,388 | Great Britain | 1919 |
| 387,194 | Great Britain | 1933 |
| 116,394 | Australia | 1943 |

OTHER REFERENCES

Kerl: Festigkeit und Dichte von feuerfesten Erzeugnissen, pages 856–858 of "Handbuch der gesamten Thonwaaren-industrie" (1907).